(12) United States Patent
Kim

(10) Patent No.: US 11,383,591 B2
(45) Date of Patent: Jul. 12, 2022

(54) ROLL MOUNT DEVICE FOR VEHICLE

(71) Applicants: HYUNDAI MOTOR COMPANY, Seoul (KR); KIA MOTORS CORPORATION, Seoul (KR)

(72) Inventor: Yong Joo Kim, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 288 days.

(21) Appl. No.: 16/688,576

(22) Filed: Nov. 19, 2019

(65) Prior Publication Data

US 2020/0384844 A1 Dec. 10, 2020

(30) Foreign Application Priority Data

Jun. 10, 2019 (KR) .................. 10-2019-0067831

(51) Int. Cl.
*B60K 5/12* (2006.01)
*F16F 15/04* (2006.01)

(52) U.S. Cl.
CPC .......... *B60K 5/1291* (2013.01); *B60K 5/1241* (2013.01); *F16F 15/04* (2013.01)

(58) Field of Classification Search
CPC ....... B60K 5/1291; B60K 5/1241; F16F 1/38; F16F 1/3828; F16F 1/3835; F16F 1/3807
See application file for complete search history.

(56) References Cited

U.S. PATENT DOCUMENTS

| | | | |
|---|---|---|---|
| 5,058,867 A | 10/1991 | Hadano et al. | |
| 6,168,144 B1 * | 1/2001 | Bruehl | F16F 13/1463 267/140.11 |
| 6,622,996 B2 * | 9/2003 | Mayerbock | B60G 7/02 267/140.11 |
| 2017/0225530 A1 * | 8/2017 | Powell | F16F 1/38 |
| 2018/0087567 A1 * | 3/2018 | Palluck | F16C 33/664 |

FOREIGN PATENT DOCUMENTS

| | | | |
|---|---|---|---|
| CN | 106015418 B | * 11/2018 | |
| JP | 2004-257570 A | 9/2004 | |
| JP | 2006-242289 A | 9/2006 | |
| JP | 2012-211604 A | 11/2012 | |
| JP | 2017-082907 A | 5/2017 | |
| JP | 2018-071664 A | 5/2018 | |
| KR | 10-1592442 B1 | 2/2016 | |
| WO | 2014-024217 A1 | 2/2014 | |
| WO | WO-2016052062 A1 | * 4/2016 | F16F 13/14 |

* cited by examiner

*Primary Examiner* — Melanie Torres Williams
(74) *Attorney, Agent, or Firm* — Morgan, Lewis & Bockius LLP

(57) ABSTRACT

A roll mount device for a vehicle includes: a front mount configured to be connected to a power train; a rear mount configured to be connected to a vehicle body; and a rod disposed between the front mount and the rear mount. The front mount comprises: a core configured to be connected to the power train to receive vibration transmitted from the power train; an outer pipe disposed outside the core and spaced from the core by a predetermined distance with respect to a radial direction of the core; an elastic body disposed between the core and the outer pipe to absorb vibration transmitted thereto from the core; and a stopper disposed on an outer surface of the core to be spaced from an inner surface of the outer pipe by a predetermined distance.

6 Claims, 4 Drawing Sheets

[FIG. 1]
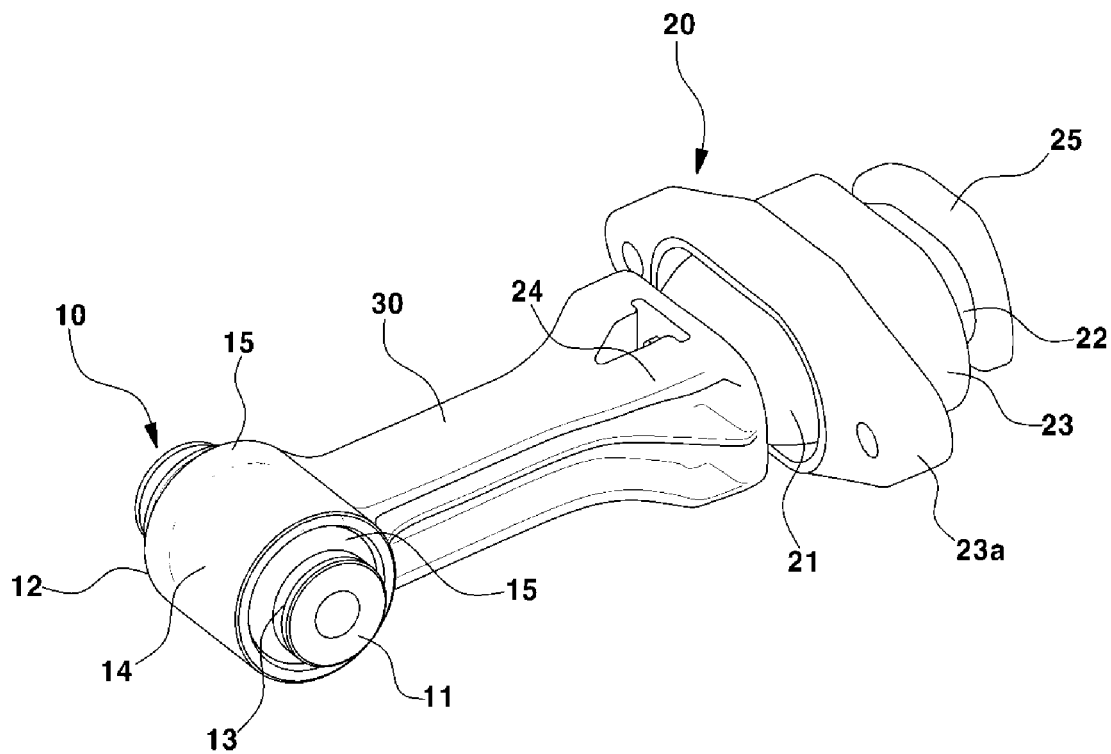

[FIG. 2]
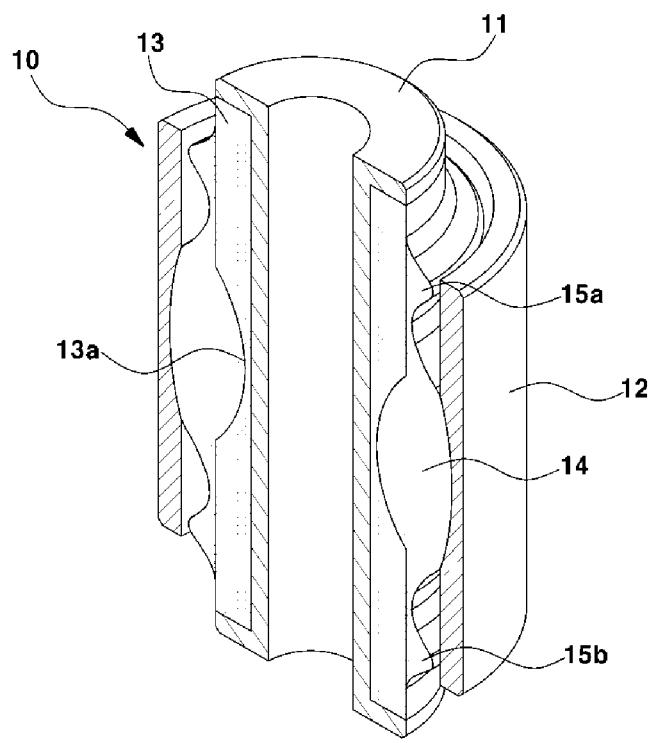

[FIG. 3]
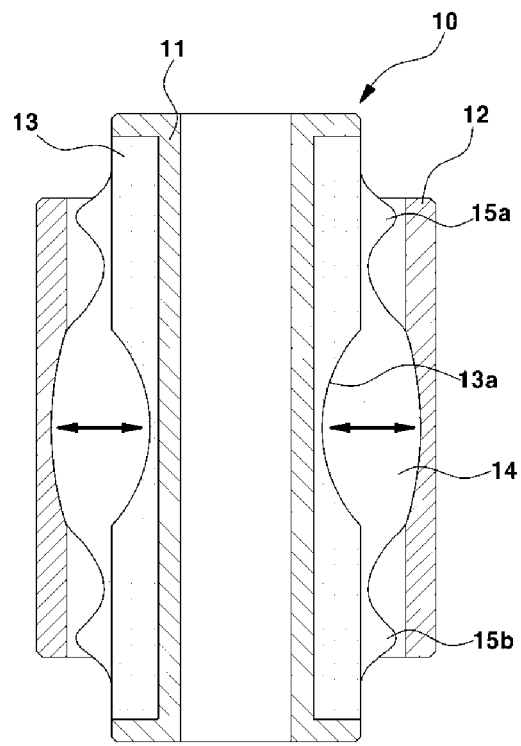

[FIG. 4]
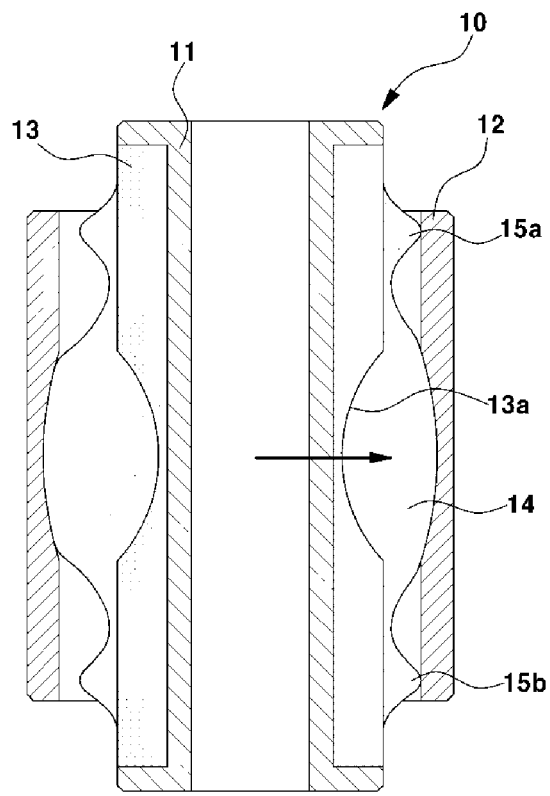
[FIG. 5]
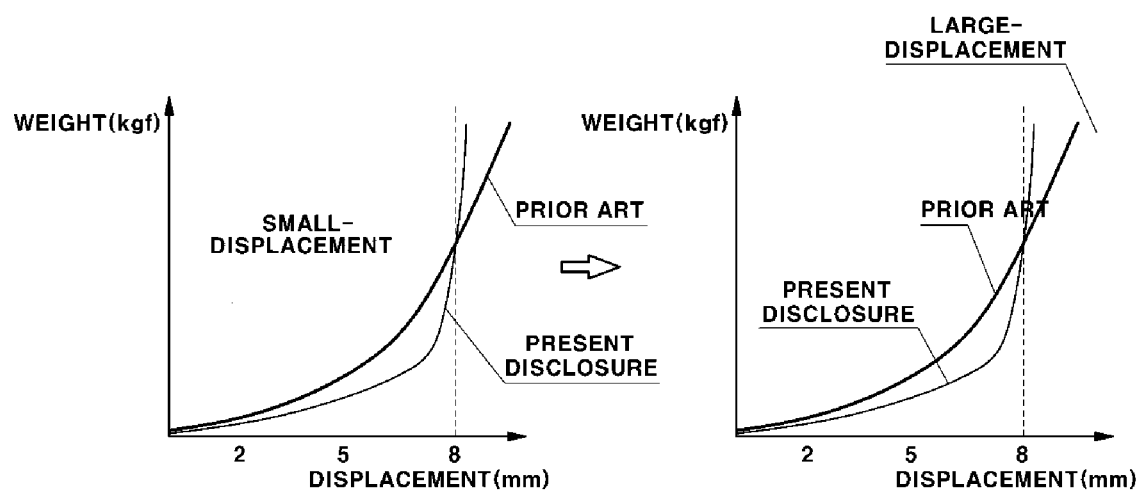

ROLL MOUNT DEVICE FOR VEHICLE

CROSS-REFERENCE TO RELATED APPLICATION

This application claims the benefit of priority to Korean Patent Application No. 10-2019-0067831 filed on Jun. 10, 2019, the entire contents of which are incorporated herein by reference.

TECHNICAL FIELD

The present disclosure relates to a roll mount device for a vehicle, and more particularly, to a roll mount device configured to improve vibration and noise performance of a vehicle.

BACKGROUND

Generally, a vehicle has employed an engine mounting system to reduce vibration and noise transmitted from a power train to a vehicle body, and the engine mounting system is classified into an inertial three-point support type and an inertial four-point support type. In the inertial three-point support type mounting system, a rod type roll mount device is applied to a lower end of the power train.

A conventional rod-type roll mount device has employed a dog bone-type roll rod in order to effectively control behavior of the power train and insulate a vibration transmitted from the power train to the vehicle body.

The conventional roll mount device has a simple shape and has a large amount of rubber used, which are advantageous for improving vibration and noise (NVH: noise, vibration, harshness) and strength, but has a drawback that it is difficult to improve complicated vibration and noise generated in an actual vehicle, in particular, booming noise generated in a specific frequency band.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art, and an object of the present disclosure is to provide a roll mount device for a vehicle capable of effectively reducing vibration and noise generated in various frequency bands, thereby improving complicated vibration and noise generated in a vehicle.

According to an aspect of the present disclosure, a roll mount device for a vehicle includes: a front mount configured to be connected to a power train; a rear mount configured to be connected to a vehicle body; and a rod disposed between the front mount and the rear mount. The front mount may include a core configured to be connected to the power train to receive vibration from the power train; an outer pipe disposed outside the core and spaced from the core by a predetermined distance with respect to a radial direction of the core; an elastic body disposed between the core and the outer pipe to absorb vibration transmitted thereto from the core; and a stopper disposed on an outer surface of the core to be spaced from an inner surface of the outer pipe by a predetermined distance.

The front mount has the following features. The stopper may be configured to come into contact with the inner surface of the outer pipe when vibration with an amplitude equal to or larger than a predetermined threshold amplitude is transmitted to the core, and configured not to come into contact with the inner surface of the outer pipe when vibration with an amplitude less than a predetermined threshold amplitude is transmitted to the core. The elastic body may be disposed on the outer surface of the core in a state in which it has been in contact with the inner surface of the outer pipe since before vibration is transmitted to the core.

The core may be provided with an insert member disposed on an outer surface thereof, and the elastic body and the stopper may be integrally formed on an outer surface of the insert member. The insert member may be provided with a concave portion having a curved shape and being concavely formed at a central portion thereof in a circumferential direction thereof, and the elastic body may be disposed on a central portion of the insert member on which the concave portion is included. In addition, the stopper may include a first stopper and a second stopper disposed at both sides of the elastic body, respectively, and each of the first stopper and the second stopper may be disposed in the circumferential direction of the insert member.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein:

FIG. 1 is a view showing a roll mount device for a vehicle according to an exemplary embodiment of the present disclosure;

FIG. 2 is a view showing a front mount according to an exemplary embodiment of the present disclosure;

FIG. 3 is a view showing a state in which a stopper does not come into contact with an inner surface of an outer pipe when a small-displacement vibration is transmitted to a core;

FIG. 4 is a view showing a state in which the stopper comes into contact with the inner surface of the outer pipe when a large-displacement vibration is transmitted to the core; and FIG. 5 is a graph showing a displacement (spring constant) according to a weight of the front mount according to an exemplary embodiment of the present disclosure compared with a conventional front mount.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, the present disclosure will be described so that those skilled in the art can easily implement the present disclosure.

As illustrated in FIG. 1, a roll mount device of the present disclosure may include a front mount 10 to be coupled to a power train, a rear mount 20 to be coupled to a vehicle body, and a rod disposed between the front mount 10 and the rear mount 20.

As illustrated in FIG. 2, the front mount 10 may include a core 11 connected to and mounted on the power train, an outer pipe 12 disposed outside the core 11, an insert member 13 disposed on an outer surface of the core 11, and an elastic body 14 and a stopper 15 disposed between the core 11 and the outer pipe 12.

The core 11 is coupled to the power train and is configured to receive a vibration of the power train. The core 11 may be formed in a cylindrical shape and may be connected to the power train by a fastening member passing through a central portion thereof. For example, the core 11 may be mounted on a lower end of a transmission constituting the power train. A central axial line of the core 11 may be arranged in a left-right direction of a vehicle.

The outer pipe 12 may be disposed outside the core 11 at a certain distance with respect to a radial direction of the core. The outer pipe 12 may be formed in a cylindrical shape having a diameter equal to or greater than that of the core 11 by a predetermined value or more, and may be disposed coaxially with the core 11. The outer pipe 12 may be integrally formed with one end of the rod 30.

The insert member 13 may be provided on an outer surface of the core 11 to be disposed on an inner surface of the elastic body 14. The insert member 13 may be formed in a cylindrical shape having an inner diameter corresponding to an outer diameter of the core 11, and has an outer diameter smaller than an inner diameter of the outer pipe 12 by a predetermined value or more. That is, the insert member 13 may be disposed inside the outer pipe 12 so as to be spaced apart from an inner surface of the outer pipe 12. The insert member 13 may be formed from plastic material. The insert member 13 may be integrally molded with and adhered to the outer surface of the core 11.

The elastic body 14 is configured to absorb a vibration transmitted in a longitudinal direction of the vehicle through the core 11. The elastic body 14 may be formed on the outer surface of the insert member 13 to be disposed between the core 11 and the outer pipe 12. The elastic body 14 may be molded of material such as rubber or the like, and may be vulcanized on the outer surface of the insert member 13 to be integrally attached thereto. The elastic body 14 may be disposed in a circumferential direction of the insert member 13 and may have a substantially elliptical cross-section.

The stopper 15 may be disposed between the core 11 and the outer pipe 12 and may be configured to control a displacement of the core 11. Specifically, the stopper 15 may be integrally molded with and adhered to the outer surface of the insert member 13. The stopper 15 is disposed on the outer surface of the insert member 13 to be spaced apart from the inner surface of the outer pipe 12 by a certain distance. The stopper 15 is spaced apart from the inner surface of the outer pipe 12 by a certain distance before a vibration is transmitted to the core 11, and when a vibration with an amplitude equal to or larger than a predetermined threshold amplitude is transmitted to the core 11, the stopper comes into contact with the inner surface of the outer pipe 12 to be pressed toward the core 11 (see FIG. 4). The stopper 15 may control a displacement of the core 11 to limit a vibration of the power train connected to the core 11.

Specifically, an inner surface of the stopper 15 may be disposed on the outer surface of the insert member 13, and an outer surface thereof may be protruded towards the inner surface of the outer pipe 12. The stopper 15 may have a substantially triangular cross-sectional configuration, and the outer surface of the stopper 15 may be disposed to be spaced apart from the inner surface of the outer pipe 12 by a certain distance. That is, the stopper 15 may be formed to be convexly protruded from the outer surface of the insert member 13. The stopper 15 may be integrally vulcanized with the elastic body. That is, the stopper 15 and the elastic body 14 may be simultaneously molded on the outer surface of the insert member 13. At this time, the stopper 15 may be disposed to be adjacent to an edge portion of the elastic body 14.

As can be seen in FIGS. 2 and 3, the stopper 15 may include a first stopper 15a and a second stopper 15b disposed on both sides of the elastic body 14 with respect to a direction of the axial line of the core 11. The first stopper 15a and the second stopper 15b may be disposed in the circumferential direction of the insert member 13. The first stopper 15a and the second stopper 15b do not come into contact with the inner surface of the outer pipe 12 when a vibration with an amplitude less than a predetermined threshold amplitude is transmitted to the core 11.

The elastic body 14 is compressed by a vibration of the core 11 even when a vibration with the amplitude less than the above threshold amplitude is transmitted to the core 11. The elastic body 14 is disposed on the outer surface of the insert member 13 in a state in which it has been in contact with the inner surface of the outer pipe 12 since before a vibration is transmitted to the core 11.

The insert member 13 may be provided with a concave portion 13a, which has a curved shape and is concavely formed at a central portion thereof, with respect to the direction of the axial line of the core 11. The concave portion 13a may be disposed in the circumferential direction of the insert member 13. The elastic body 14 may be disposed on a central portion of the insert member 13 on which the concave portion 13a is included. Accordingly, a sufficient space for disposing the elastic body 14 is secured between the insert member 13 and the outer pipe 12 and a sufficient amount of rubber which is necessary for securing insulation performance of the elastic body 14 can be applied. That is, it is possible to improve the insulation performance of the elastic body 14 by increasing a size (the amount of rubber) of the elastic body 14 disposed in the limited space between the insert member 13 and the outer pipe 12. At the central portion of the insert member 13, the elastic body 14 may have a thickness greater than a gap between an edge portion of the insert member 13 and the outer pipe 12.

Both side edge portions of the insert member 13 are not provided with the concave portion 13a, and the first stopper 15a and a second stopper 15b are disposed at the above edge portions of the insert member 13. The central portion of the insert member 13 on which the elastic body 14 is disposed may have a thickness smaller than that of the edge portion of the insert member 13 on which the first stopper 15a and the second stopper 15b are disposed.

FIG. 3 is a view showing a state in which the stopper does not come into contact with the inner surface of the outer pipe when a small-displacement vibration is transmitted to the core, and FIG. 4 is a view showing a state in which the stopper comes into contact with the inner surface of the outer pipe when a large-displacement vibration is transmitted to the core.

When the core 11 is vibrated while compressing the elastic body 14 by a vibration (that is, a large-displacement vibration) having an amplitude equal to or larger than a predetermined threshold amplitude, the stopper 15 comes into contact with the inner surface of the outer pipe 12 and is compressed (see FIG. 4). When the stopper 15 is compressed, the stopper 15 is supported on the insert member 13 disposed on the inner surface of the stopper 15, so that that a large-displacement vibration of the core 11 can be more effectively and quickly controlled.

When a vibration (a small-displacement vibration) with an amplitude less than the threshold amplitude is transmitted to the core 11, the elastic body 14 is compressed and absorbs a vibration to insulate a vibration transmitted to the core 11, and the inner pipe 15 does not come into contact with the inner surface of the outer pipe 12 (see FIG. 3). The elastic body 14 is molded using a sufficient amount of rubber necessary for insulating a small-displacement vibration, and therefore the front mount 10 can sufficiently secure insulation performance against a small-displacement vibration.

The front mount 10 constructed as described above can secure sufficient insulation performance using the elastic body 14 under the condition that a high-frequency small-displacement vibration is transmitted to the core 11, such as at the time of engine idling and constant speed driving, and can control a displacement of the core 11 using the elastic body 14 and the stopper 15 to control vibration and behavior of the power train under the condition that a low-frequency large-displacement vibration is transmitted to the core 11, such as at the time of rapid acceleration, start and braking. That is, the front mount 10 can effectively absorb a high-frequency small-displacement vibration and a low-frequency large-displacement vibration.

FIG. 5 is a graph showing a displacement (spring constant) according to a weight of the front mount according to an exemplary embodiment of the present disclosure compared with a conventional front mount.

Referring to FIG. 5, the front mount 10 can secure a low spring constant as compared with a conventional front mount when a small-displacement vibration is transmitted to the core 11, and can secure a high spring constant as compared with a conventional front mount when a large-displacement vibration is transmitted to the core 11. Accordingly, the front mount 10 can realize improved insulation performance as compared with the conventional front mount when an engine is idling and a vehicle is traveled at constant speed, and can quickly control a displacement of the power train as compared with the conventional front mount at the time of aggressive driving, such as at the time of rapid acceleration, start and braking.

In addition, since the elastic body 14 and the stopper 15 are integrally formed on the outer surface of the insert member 13, a manufacturing process of the front mount 10 is simplified, and therefore an increase in the cost of the front mount 10 caused by adding the stopper can be prevented.

As illustrated in FIG. 1, the rear mount 20 may include a pair of rear elastic bodies 21 and 22 assembled to a bolt member 24 coupled to a rear end portion of the rod 30, and a mount pipe 23 in which the rear elastic bodies 21 and 22 are received. The pair of rear elastic bodies 21 and 22 may be a first rear elastic body 21 and a second rear elastic body 22 formed of vulcanized rubber material.

The first rear elastic body 21 may be press-fitted into and disposed in the mount pipe 23 in a state of being fitted into the bolt member 24. The second rear elastic body 22 may pass through the bolt member 24 and be then disposed behind the first rear elastic body 21. The second rear elastic body 22 may be press-fitted into and received in the mount pipe 23.

An end plate 25 may be disposed on and fixed to a rear end of the second rear elastic body 22. In addition, an outer surface of the mount pipe 23 may be provided with a bracket 23a coupled to the vehicle body.

The roll mount device for a vehicle according to the present disclosure has the advantage of effectively reducing vibration and noise generated in various frequency bands to improve complicated vibration and noise generated in an actual vehicle.

Although the present disclosure has been shown and described with reference to preferred embodiments thereof for illustrating a principle of the present disclosure, the present disclosure is not limited to the structure and the operation described with reference to the drawings in the above embodiments, and it will be appreciated by those skilled in the art that numerous changes and modifications of the disclosure are possible without departing from the spirit and scope defined in the appended claims.

What is claimed is:

1. A roll mount device for a vehicle comprising:
   a front mount configured to be connected to a power train;
   a rear mount configured to be connected to a vehicle body; and
   a rod disposed between the front mount and the rear mount,
   wherein the front mount comprises:
   a core configured to be connected to the power train to receive vibration transmitted from the power train;
   an outer pipe disposed outside the core and spaced from the core by a predetermined distance with respect to a radial direction of the core;
   an elastic body disposed between the core and the outer pipe to absorb vibration transmitted thereto from the core;
   a stopper disposed on an outer surface of the core to be spaced from an inner surface of the outer pipe by a predetermined distance; and
   an insert member disposed on an outer surface of the core, wherein the elastic body and the stopper are integrally formed on an outer surface of the insert member, wherein the insert member includes a concave portion having a curved shape at a central portion of the insert member in a circumferential direction thereof, wherein the elastic body is disposed on the central portion of the insert member, and wherein a thickness of the central portion of the insert member is smaller than a thickness of an edge portion of the insert member.

2. The roll mount device of claim 1, wherein the stopper is configured to come into contact with the inner surface of the outer pipe when vibration with an amplitude equal to or larger than a predetermined threshold amplitude is transmitted to the core.

3. The roll mount device of claim 2, wherein the stopper is configured not to come into contact with the inner surface of the outer pipe when vibration with an amplitude less than the predetermined threshold amplitude is transmitted to the core.

4. The roll mount device of claim 1, wherein the elastic body is disposed on the outer surface of the core and in contact with the inner surface of the outer pipe.

5. The roll mount device of claim 1, wherein the stopper comprises a first stopper and a second stopper disposed at both sides of the elastic body, respectively, and each of the first stopper and the second stopper is disposed in the circumferential direction of the insert member.

6. The roll mount device of claim 1, wherein the outer pipe is disposed coaxially with the core.

* * * * *